United States Patent [19]

Habermeier

[11] 4,038,255

[45] July 26, 1977

[54] LINEAR POLYESTERS BASED ON N,N-HETEROCYCLIC DICARBOXYLIC ACIDS

[75] Inventor: Jürgen Habermeier, Pfeffingen, Switzerland

[73] Assignee: Ciba-Geigy Corporation, Ardsley, N.Y.

[21] Appl. No.: 633,771

[22] Filed: Nov. 20, 1975

[30] Foreign Application Priority Data

Nov. 29, 1974 Switzerland .................. 15866/74

[51] Int. Cl.$^2$ .................. C08G 63/12; C08G 63/16
[52] U.S. Cl. .................................. 260/75 N
[58] Field of Search ........................... 260/75 N

[56] References Cited

U.S. PATENT DOCUMENTS

| 3,856,754 | 12/1974 | Habermeier et al. | 260/75 N |
|---|---|---|---|
| 3,860,564 | 1/1975 | Habermeier et al. | 260/75 N |
| 3,886,123 | 5/1975 | Habermeier et al. | 260/75 N |
| B 521,126 | 2/1976 | Habermeier | 260/75 N |
| B 522,489 | 2/1976 | Buybaum et al. | 260/75 N |

Primary Examiner—Lucille M. Phynes
Attorney, Agent, or Firm—Luther A. R. Hall

[57] ABSTRACT

New homopolyesters and copolyesters are obtained by polycondensing dicarboxylic acid derivatives which contain a N,N-heterocyclic radical and which are manufactured from cyclic ureides and 4-halogenomethylbenzoic acid derivatives, and, if appropriate terephthalic acid of isophthalic acid derivatives, with alkanediols and/or N,N-heterocyclic diols. The new polyesters, which are distinguished by valuable toughness and high Tg values, are particularly suitable for use as "engineering plastics" materials.

7 Claims, No Drawings

LINEAR POLYESTERS BASED ON N,N-HETEROCYCLIC DICARBOXYLIC ACIDS

The present invention relates to linear, thermoplastic polyesters based on dicarboxylic acids containing a N,N-heterocyclic radical, or esters thereof, alkanediols and/or N,N-heterocyclic diols and to a process for their manufacture.

Polyalkylene terephthalates, particularly polyethylene terephthalate, have found a broad field of application as engineering plastic materials, since these linear polyesters give shaped articles having high mechanical strength properties when processed by injection moulding or extrusion. Partly crystalline polyethylene terephthalate suffers, however, from the disadvantage of being relatively difficult to process, while amorphous polyethylene terephthalate, which can be processed easily, has a glass transition temperature (Tg) of about 72° C, which is too low for many applications. In the case of polybutylene terephthalate, which is usually present in a partly crystalline form, the Tg is even as low as about 22° C.

There has been no lack of attempts to modify polyalkylene terephthalates in order to obtain linear polyesters having higher Tg values and better processing properties. Thus it is proposed, for example in DT-OS No. 2,342,415, to use hydroxyalkylated 1,1'-methylene-bis-hydantoins as the diol co-component in the manufacture of linear polyesters based on terephthalic acid and/or isophthalic acid. Similarly, it is proposed in DT-OS NO. 2,342,431 to use hydroxyalkylated benzimidazolones as the diol co-component. Although the polyalkylene terephthalates modified in this manner have increased Tg values and improved processing properties, the toughness properties, for example the impact strength, of these polyesters still leave something to be desired.

It has now been found that polyesters having improved toughness properties and also higher Tg values are obtained if the terephthalic acid or isophthalic acid component in the known polyalkylene terephthalates or isophthalates is completely or partially replaced by a dicarboxylic acid component containing a N,N-heterocyclic radical. The new polyesters can be readily manufactured by the customary melt condensation process.

The present invention therefore relates to linear, thermoplastic polyesters having a relative viscosity of 1.2 to 3.0, measured at 30° C on a 1% strength solution consisting of equal parts of phenol and tetrachloroethane, which are characterised by the structural elements of the general formula I

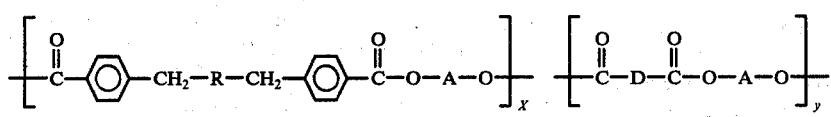

(I)

wherein R denotes a N,N-heterocyclic radical of the formula

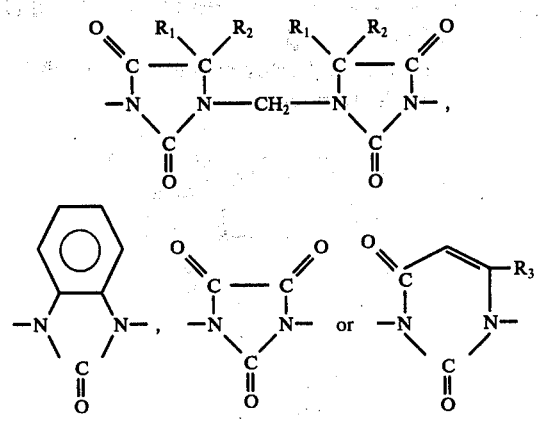

wherein $R_1$ and $R_2$ independently of one another each denote a hydrogen atom or an alkyl group having 1 to 3 C atoms, $R_3$ represents a hydrogen atom or the methyl group, A denotes an aliphatic radical having 2 to 6 C atoms, a N,N'-heterocyclic-aliphatic radical of the formula

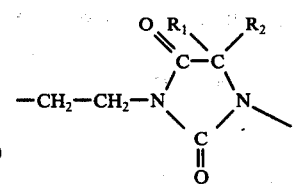

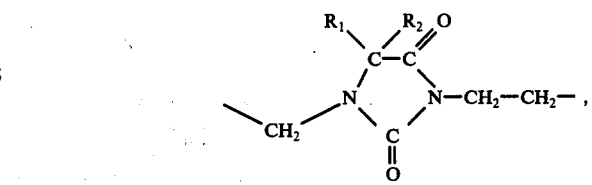

or the formula

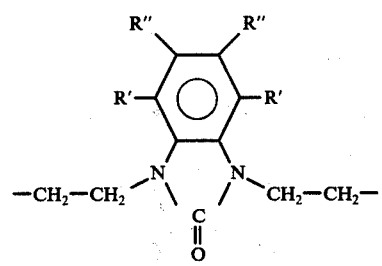

wherein $R_1$ and $R_2$ have the same meaning as above and R' and R" represent H, chlorine or bromine atoms or R' represents a H atom and R" represents a chlorine or bromine atom, D denotes the meta- or para-phenylene radical and x and y represent integers, and the mol fraction $x/(x + y)$ derived from x and y can have values from 0.05 to 1.0.

In the formula I, R preferably denotes a N,N-heterocyclic radical of the formula

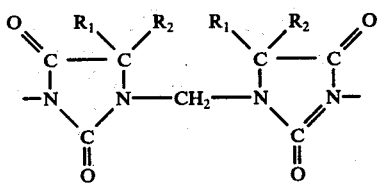

or the formula

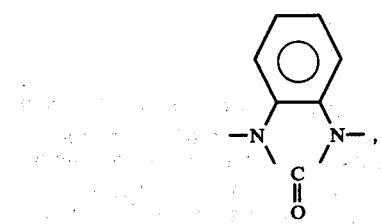

and A preferably denotes an aliphatic radical having 2 to 6 C atoms or a N,N'-heterocyclic-aliphatic radical of the formula

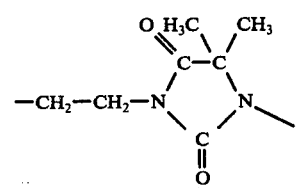

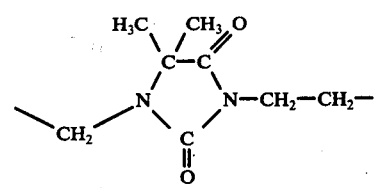

or the formula

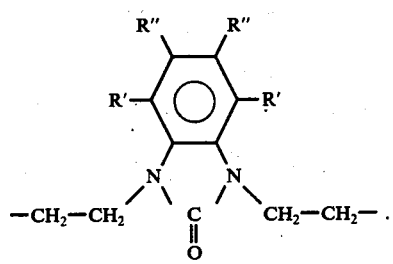

In particular, the polyesters having the structural elements of the formula I possess a relative viscosity of 1.3 to 2.5 and, in the formula I, R denotes a N,N-heterocyclic radical of the formula

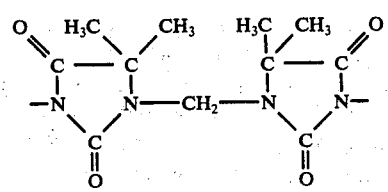

or the formula

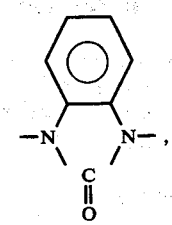

A denotes an aliphatic radical having 2 to 4 C atoms, or a N,N'-heterocyclic-aliphatic radical of the formula

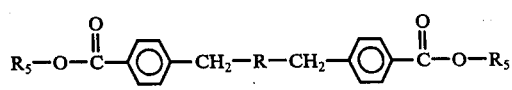

or the formula wherein R' and R'' represent H, chlorine or bromine atoms or R' represents a H atom and R'' represents a chlorine or bromine atoms, D denotes the para-phenylene radical and $x$ and $y$ represent integers, and the mol fraction $x/(x + y)$ derived from $x$ and $y$ can have values from 0.1 to 0.95.

The new polyesters having the structural elements of the formula I are obtained by known processes, by polycondensing in a known manner, in a molar ratio corresponding to the mol fraction $x/(x + y) = 0.05$ to 1.0, and in the presence of catalysts, to a relative viscosity of 1.2 to 3.0, measured at 30° C on a 1% strength solution consisting of equal parts of phenol and tetrachloroethane, $x$ mols of a dicarboxylic acid, or polyester-forming derivatives thereof, of the formula II (II)

$$R_5-O-\overset{O}{\underset{\|}{C}}-\bigcirc-CH_2-R-CH_2-\bigcirc-\overset{O}{\underset{\|}{C}}-O-R_5$$

wherein R has the same meaning as in formula I and $R_5$ represents a hydrogen atom or the methyl, ethyl or phenyl group, and $y$ mols of terephthalic acid or isophthalic acid or polyester-forming derivatives thereof, with $x$ plus $y$ mols of an aliphatic diol containing 2 to 6 C atoms and/or of a N,N'-heterocyclic-aliphatic diol of the formula III

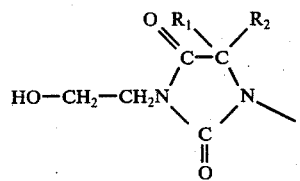 (III)

and/or the formula IV

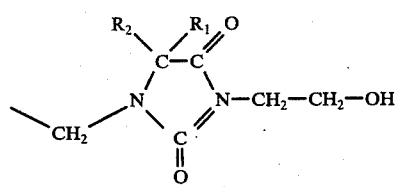 (IV)

wherein $R_1$ and $R_2$ independently of one another each denote a hydrogen atom or an alkyl group having 1 to 3 C atoms, R' and R" represent H, chlorine or bromine atoms or R' represents a H atom and R" represents a chlorine or bromine atom, $x$ and $y$ denoting integers.

It is preferable to use compounds of the formula II wherein R denotes a radical of the formula

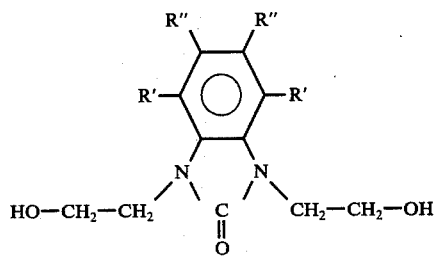

or the formula

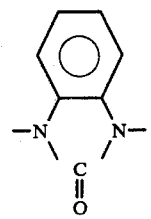

as compounds of the formula II, and to use compounds of the formula III wherein $R_1$ and $R_2$ each represent the methyl group, as the compound of the formula III.

In particular, $x$ mols of a dicarboxylic acid or dimethyl or diethyl ester thereof, of the formula II, wherein R denotes a N,N-heterocyclic radical of the formula

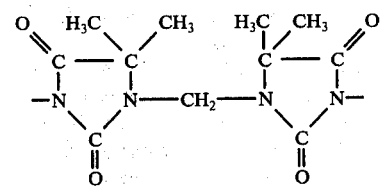

or the formula

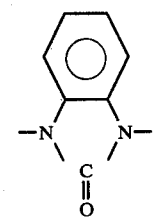

and $R_5$ denotes the methyl or ethyl group, and $y$ mols of terephthalic acid or the dimethyl or diethyl ester thereof, $x$ and $y$ denoting integers, are polycondensed, in a molar ratio corresponding to the mol fraction $x/(x + y) = 0.1$ to $0.95$, to a relative viscosity of 1.3 to 2.5, with $x$ plus $y$ mols of an aliphatic diol containing 2 to 4 C atoms and/or of a N,N'-heterocyclic diol of the formula III and/or the formula IV, wherein $R_1$ and $R_2$ each denote a methyl group and R' and R" denote hydrogen, chlorine or bromine atoms.

The dicarboxylic acids or polyester-forming derivatives thereof, of the formula II, can be manufactured by reacting 1 mol of a N,N-heterocyclic compound of the formulae

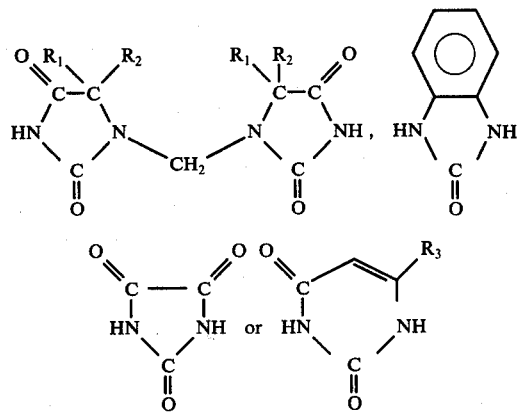

wherein $R_1$ and $R_2$ independently of one another each denote a hydrogen atom or an alkyl group having 1 to 3 C atoms, and $R_3$ represents a hydrogen atom or the methyl group, with 2 mols of a 4-halogenomethylbenzoic acid, in particular 4-chloromethylbenzoic acid, or the dimethyl, diethyl or diphenyl ester thereof, whilst splitting off 2 mols of hydrogen halide, preferably in a polar, aprotic solvent and in the presence of an acid acceptor, at elevated temperature, to give compounds of the formula II. The abovementioned N,N-heterocyclic compounds and the 4-halogenomethylbenzoic acid, and the diesters thereof, are known compounds.

The low molecular dialkyl esters having 1 to 4 carbon atoms in the molecule, preferably dimethyl and diethyl esters, or the diphenyl esters, are mainly used as the polyester-forming derivatives of terephthalic and isophthalic acid. Furthermore, the acid dihalides, particularly the acid dichlorides, are also suitable.

The 1,1'-methylene-bis-[3-(2-hydroxyethyl)-hydantoins] of the formula III are known compounds and can be manufactured by the process described in U.S. Pat. No. 3,679,681, by adding on 2 mols of ethylene oxide to 1 mol of the corresponding 1,1'-methylene-bis-(hydantoin).

Compounds which correspond to the formula IV are e.g. 1,3-di-(2-hydroxyethyl)-benzimidazolone, 1,3-di-(2-hydroxyethyl)-4,5,6,7-tetrachlorobenzimidazolone, 1,3-di-(2-hydroxyethyl)-4,5,6,7,-tetrabromobenzimidazolone, 1,3,-di-(2-hydroxyethyl)-5,6-dichlorobenzimidazolone and 1,3-di-(2-hydroxyethyl)-5,6-dibromobenzimidazolone.

1,3-Di-(2-hydroxyethyl)-benzimidazolone is known from the literature. It can, for example, be obtained by the process described in DT-OS No. 2,342,432 by adding on two mols of ethylene oxide to 1 mol of benzimidazolone. The halogensubstituted benzimidazolone compounds can be manufactured by chlorinating and/or brominating 1,3-di-(hydroxyethyl)-benzimidazolone in a known manner.

The new polyesters can also be manufactured by using mixtures of both N-heterocyclic diols of the formula IV and mixtures which contain the N-heterocyclic diol of the formula III, and any desired mixing ratio can be selected, that is to say it is not critical.

The known processes for the manufacture of the new polyesters are, for example, solution condensation or azeotropic condensation, interfacial condensation, melt condensation or solid phase condensation as well as a combination of these methods, depending on which polyester-forming derivatives and catalysts for the reaction are used.

The new polyesters can be manufactured by esterifying or transesterifying dicarboxylic acids, or polyester-forming derivatives thereof, of the formula II and, if appropriate, terephthalic acid or isophthalic acid, or the low molecular dialkyl esters of these dicarboxylic acids, with the aliphatic diols and/or the N,N'-heterocyclic-aliphatic diols of the formula III and/or IV, in an inert atmosphere, for example a nitrogen atmoshpere, in the presence of catalysts and with simultaneous removal of, respectively, the water or alkanol formed, at 150°-250° C, and subsequently carrying out the polycondensation at 200°-270° C and under reduced pressure, in the presence of certain catalysts, until the polycondensates have the desired viscosities.

When manufacturing polyesters which, besides the N,N'-heterocyclic-aliphatic diols, also contain aliphatic diols, it is advantageous to use this diol component in excess, so that, after the esterification or transesterification reaction, essentially monomeric diglycol esters of all the dicarboxylic acids are obtained, which are then polycondensed in the presence of a polycondensation catalyst and while distilling off the excess aliphatic diol of the formula III in vacuo. Amines, inorganic or organic acids, for example hydrochloric acid or p-toluene-sulphonic acid, or metal compounds, which are also suitable for use as transesterification catalysts, can be used in a known manner as the esterification catalysts.

Since some catalysts preferentially accelerate the transesterification and others the polycondensation, it is advantageous to use a combination of several catalysts. Examples of suitable transesterification catalysts are the oxides, salts or organic compounds of the metals calcium, magnesium, zinc, cadmium, magnesium, titanium and cobalt. It is also possible to use the metals as such, as catalysts. The polycondensation is catalysed, for example, by metals such as lead, titanium, germanium and, in particular, antimony, and compounds thereof. These catalysts can be added to the reaction mixture together or separately. These catalysts are employed in quantities of about 0.001 to 1.0 per cent by weight, relative to the acid component.

When manufacturing the new polyesters it is particularly advantageous to use those catalysts which accelerate both the transesterification and the polycondensation. Catalysts of this kind which can be used are, above all, mixtures of various metals or metal compounds as well as corresponding metal alloys.

The polycondensation reaction is carried out until the polyesters have a relative viscosity of 1.1. to 3.0, preferably 1.3 to 2.5. Depending on the nature of the catalyst used and the size of the batch, the reaction times are about 30 minutes to several hours. The resulting polyester melt is removed from the reaction vessel, cooled in the customary manner, and then granulated or cut into chips.

Another process for the manufacture of the new copolyesters consists in polycondensing dicarboxylic acids of the formula II and dihalides of terephthalic acid or isophthalic acid, preferably the corresponding acid dichlorides, with the aliphatic diols and/or the N,N'-heterocyclic-aliphatic diols of the formula III and/or the formula IV, in the presence of a basic catalyst, in the temperature range from 0° to 180° C, while eliminating hydrogen halide and water. Tertiary amines or quaternary ammonium salts are preferably used as the basic catalyst. The proportion of the basic catalyst can be from 0.1 to 100 mol%, relative to the acid halides. This process can also be carried out without a solvent or in the presence of a solvent.

The polycondensation can also be carried out by first condensing the starting compounds, in the melt, until a certain viscosity is reached, then granulating, for example with the aid of an underwater granulator, the precondensate thus produced, drying the granules and then subjecting them to a solid phase condensation in which a vacuum and temperatures below the melting point of the granules are used. Higher viscosities in the polyesters can be achieved in this way.

When working up the polyester melt, or even before the polycondensation reaction, inert additives of all kinds, such as, for example, fillers, reinforcing materials, particularly glass fibres, inorganic or organic pigments, optical brighteners, delustring agents, agents for promoting crystallisation and additives which impart non-inflammable or flame-retarding properties, such as, for example, antimony trioxide and organic compounds which have a high content of chlorine and bromine, can be added to the reaction mass.

If the polycondensation reaction is carried out discontinuously, these known measures can be taken already during the last stages of the condensation, for example in the solid phase condensation or at the end of the melt condensation.

The polyesters according to the invention can be partly crystalline or amorphous, depending on which dicarboxylic acids and which diols are used as the starting components and in which ratios these are employed.

The new polyesters are colourless to yellow-coloured and are thermoplastic materials from which moulded materials having valuable thermo-mechanical properties can be manufactured by the customary shaping processes, such as casting, injection moulding and extrusion. The new polyesters can be processed readily on conventional injection moulding machines.

The new polyesters are particularly suitable for use as "engineering plastic" materials which can be used for the manufacture of shaped articles, such as gear wheels, containers for chemicals or food, machine parts and parts of apparatus, sheets, plates, films, fusion adhesives and coatings, and also for the manufacture of semi-finished products which can be shaped by machining. The polyesters can also be used for coating objects, for example by the known powder coating processes.

The polyesters prepared in the examples which follow are characterized more exactly by the following characteristic data: the polyesters are characterised by those morphological changes which are measured by means of differential thermo-analysis on a sample which is heat-treated for 3 minutes at 30°C above the melting point or softening point and is then rapidly chilled. The chilled sample is heated at a heating-up rate of 16°C/minute by means of a "DSC-2B" Differential Scanning Calorimeter of Messrs. Perkin-Elmer. The glass transition temperature quoted is as the point of inflection at the sudden increase in the specific heat in the thermogram, the crystallisation temperature quoted is as the apex of the exothermic peak and the melting point quoted is as the apex of the endothermic peak. If a Tg range is indicated, for example Tg = 160°–178°C, this means the range in which there is a sudden increase in the specific heat in the thermogram. The relative viscosity of the polycondensates of the examples is determined at 30°C on solutions of 1 g of polyester in 100 ml of a mixture consisting of equal parts of phenol and tetrachloroethane. The softening point is determined by the Kofler method on a microscope with a heated stage, at a heating-up rate of 15°C/minute, a cross being formed from 2 filaments and the softening point being taken as the temperature at which the sharp angles of the cross disappear. The nitrogen content is determined by elementary analysis.

Preparation examples

Example 1

Homopolyester formed from 1,1'-methylene-bis-[3-(4'-methoxycarbonylbenzyl)-5,5-dimethylhydantoin] and ethylene glycol The following mixture
50.8 g (0.09 mol) of 1,1'-methylene-bis-[3-(4'-methoxy-carbonylbenzyl)-5,5-dimethylhydantoin],
27.9 g (0.45 mol) of ethylene glycol,
0.03 of calcium acetate,
0.04 g of zinc acetate and
0.1 g of antimony trioxide is submitted to transesterification and polycondensation in a glass apparatus equipped with a thermometer, a descending condenser, a stirrer and a nitrogen inlet, under the following conditions:
2 hours / 160°C → 210°C / N$_2$ / normal pressure
1.5 hours / 210°C → 245°C / N$_2$ / normal pressure
1.5 hours / 245°C → 260°C / N$_2$ / 760 mm Hg → 16 mm Hg
10 minutes / 260°C N$_2$ / 16 mm Hg → 0.4 mm Hg
30 minutes / 260°C → 280°C / N$_2$ / 0.4 mm Hg This gives a glass-clear, amorphous polyester which has a softening point (Kofler) of 225°C and a relative viscosity of 1.63. The glass transition range (DSC-2B*) is 147°–155°C; the decomposition temperature (DSC-2B) is about 330°C.

*)Differential-Scanning-Calorimeter - 2B

Example 2

Homopolyester formed from 1,3-di-(4'-methoxycarbonylbenzyl)-benzimidazolone and ethylene glycol In accordance with Example 1, a mixture of 38.74 g (0.09 mol) of pure 1,3-di-(4'-methoxycarbonylbenzyl)-benzimidazolone and 27.9 g (0.45 mol) of pure ethylene glycol is transesterified and polycondensed under the catalytic action of 0.04 g of calcium acetate, 0.05 g of zinc acetate, 0.02 g of manganese acetate and 0.11 g of antimony trioxide, by using the reaction conditions according to Example 1. The polyester obtained in this way has the following properties:

| Softening point (Kofler) | 225° C |
| Relative viscosity | 1.64 |
| Glass transition range (DSC) | 136 – 145° C |
| Decomposition temperature (DSC) | 344° C |

Example 3

Homopolyester formed from 1,3-di-(4'-methoxycarbonylbenzyl)-benzimidazolone and 1,4-butanediol A mixture of 64.56 g (0.15 mol) of 1,3-di-(4'-methoxycarbonylbenzyl)-benzimidazolone and 67.50 g (0.75 mol) of pure 1,4-butanediol is transesterified and polycondensed under the catalytic action of 1.8 ml of a 0.02 molar solution of tetraisopropyl orthotitanate in n-butanol under the conditions set out below:
4 hours / 160°C → 220°C / N$_2$ / normal pressure
1.5 hours / 220°C → 260°C / N$_2$ / 760 mm Hg → 18 mm Hg
30 minutes / 260°C 18 mm Hg → 0.02 mm Hg A pale yellow polyester which is at first clear but crystallises slowly, is obtained in this way. The product is partly crystalline and has the following data:

| Softening point (Kofler) | 195° C |
| Crystallite melting point (DSC) | 244° C |
| Relative viscosity | 1.72 |
| Glass transition range (DSC) | 110 – 117° C |
| Decomposition temperature (DSC) | 353° C |

Example 4

Co-polyethylene terephthalate containing 30 mol % of 1,1'-methylene-bis-[3-(4'-methoxycarbonylbenzyl)-5,5-dimethylhydantoin]

The reactants listed below are transesterified and polycondensed in accordance with the temperature/pressure programme mentioned in Example 1, using the following catalyst composition and a procedure exactly in accordance with that of Example 1:

Catalyst mixture 0.06 g of calcium acetate
0.06 g of zinc acetate
0.06 g of manganese acetate and
0.18 g of antimony trioxide Reactants 37.64 g (0.194 mol) of purified dimethyl terephthalate
49.80 g (0.083 mol) of 1,1'-methylene-bis-[3-(4'-methoxycarbonylbenzyl)-5,5-dimethylhydantoin] and 60.14 g (0.97 mol) of ethylene glycol.

This gives a pale, clear, amorphous resin which proves to be relatively tough and which has the following properties:

| Softening point (Kofler) | 185° C |
|---|---|
| Relative viscosity | 1.66 |
| Glass transition range (DSC) | 106 – 116° C |
| Decomposition temperature (DSC) | 342° C |

Example 5

Co-polybutylene terephthalate containing 33 mol % of 1,3-di-(4'-methoxycarbonylbenzyl)-benzimidazolone 30.0 g (0.33 mol) of 1,4-butanediol are added to a mixture of 38.8 g (0.2 mol) of dimethyl terephthalate and 43.0 g (0.1 mol) of 1,3-di-(4'-methoxycarbonylbenzyl)-benzimidazolone and transesterification and polycondensation are carried out under the catalytic action of 2.4 ml of a 0.02 M solution in n-butanol of tetraisopropyl orthotitanate in accordance with the following temperature programme:

2 hours/150° → 200°C/nitrogen atmosphere/normal pressure
2.5 hours /200° → 240°C/nitrogen atmosphere/normal pressure
1 hour /240° → 280°C/$N_2$/200 mm Hg → 18 mm Hg
1 hour /280° → 295°C/$N_2$/18 mm Hg → 0.2 mm Hg A clearly transparent, light brown, amorphous copolyester which has a relatively viscosity of 1.35 and a glass transition range (DSC-2B) of 55°–66°C is obtained in ths way. As a comparison, pure polybutylene terephthalate is partly crystalline and has a glass transition range of 22°–28°C.

Example 6

Co-polyhexamethylene terephthalate containing 4 mol % of 1,1'-methylene-bis-[3-(4'-methoxycarbonylbenzyl)-5-isopropylhydantoin]

24.3 g (0.125 mol) of dimethyl isophthalate are mixed with 29.6 g (0.05 mol) of 1,1'-methylene-bis-[3-(4'-methoxycarbonylbenzyl)-5-isopropylhydantoin] and 23.6 g (0.2 mol) of 1,6-hexanediol are added to this mixture. The transesterification phase is carried out for 3 hours under the catalytic action of a mixture of 0.04 g of calcium acetate, 0.05 g of zinc acetate and 0.02 g of manganese acetate, the reaction mixture being warmed from 150° to 230° C, whilst stirring. After adding 0.1 g of antimony trioxide, the polycondensation is carried out in accordance with the following temperature programme:

1 hour/230 → 280°C/$N_2$; 200 mm Hg → 15 mm Hg
1 hour/280 → 295°C/$N_2$; 15 mm Hg → 0.1 mm Hg The clear, amorphous poly(hexamethylene terephthalate) copolyester obtained in this way has a relative viscosity of 1.40. The glass transition range is 22°–38° C.

Example 7

Co-polyethylene terephthalate containing 30 mol % of 1,1'-methylene-bis-[3-(4'-ethoxycarbonylbenzyl)-5,5-dimethylhydantoin]

A mixture of (a) 37.64 g (0.194 mol) of dimethyl terephthalate (DMT), (b) 49.2 g (0.083 mol) of 1,1'-methylene-bis-[3-(4'-ethoxycarbonylbenzyl)-5,5-dimethylhydantoin] and (c) 60.14 g (0.97 mol) of ethylene glycol is transesterified and polycondensed, using a catalyst mixture consisting of 0.065 g of calcium acetate, 0.05 g of zinc acetate, 0.05 g of manganese acetate and 0.15 g of antimony trioxide, in accordance with the following temperature programme:

3 hours /140 → 205°C/nitrogen atmosphere/normal pressure
1.5 hours /205 → 230°C/nitrogen atmosphere/normal pressure
1 hour /230 → 265°C/$N_2$/200 mm Hg → 17 mm Hg
42 hours /265 → 280°C/$N_2$/0.7 mm Hg → 0.5 mm Hg.

The light brown, clearly transparent, tough copolyester thus obtained softens at 160° C (Kofler) and its relative viscosity is 1.65.

| Glass transition temperature (DSC-2B) | 107 – 120° C |
|---|---|
| Decomposition temperature | 345° C |

Example 8

Co-polyethylene terephthalate containing 15 mol % of 1,3-di-(4'-methoxycarbonylbenzyl)-6-methyluracil A mixture of 12.1 g of DMT (0.0623 mol) dimethyl terephthalate, 4.65 g (0.011 mol) of 1,3-di-(4'-methoxycarbonylbenzyl)-6-methyluracil and 16.45 g of ethylene glycol is transesterified and polycondensed in accordance with the reaction conditions described in Example 7, under the catalytic action of 0.018 g each of calcium acetate, manganese acetate and zinc acetate and 0.05 g of antimony trioxide. A tough, clear polycondensate with a softening point of 170° C (Kofler) and a relative viscosity of 1.96 is obtained in this way.

| Glass transition range (DSC) | 93 – 102° C |
|---|---|
| Decomposition temperature (DSC) | 352° C |

Example 9

Co-polyethylene terephthalate containing 15 mol % of 1,3-di-(4'-methoxycarbonylbenzyl)-parabanic acid 16.5 g (0.085 mol) of dimethyl terephthalate are mixed with 6.16 g (0.015 mol) of 1,3-di-(4'-methoxycarbonylbenzyl)-parabanic acid and 22.3 g of ethylene glycol and the transesterification and polycondensation reaction are carried out under the action of 0.02 g each of calcium acetate, zinc acetate and manganese acetate and 0.06 g of antimony trioxide, in exact accordance with Example 7. This gives an amorphous copolyester which has a relatively viscosity of 1.50.

| Glass transition range (DSC) | 76 – 86° C |
|---|---|
| Decomposition temperature (DSC) | approx. 290° C. |

Example 10

Homopolyester formed from 1,1'-methylene-bis-[3-(p-methoxycarbonylbenzyl)-5,5-dimethylhydantoin] and 1,3-di-(2'-hydroxyethyl)-5,5-dimethylhydantoin A mixture of 28.23 g (0.05 mol) of 1,1'-methylene-bis-[3-(p-methoxycarbonylbenzyl)-5,5-dimethylhydantoin] and 10.81 g (0.05 mol) of 1,3-di-(2'-hydroxyethyl)-5,5-dimethylhydantoin is reacted and polycondensed under the catalytic action of 0.017 g of calcium acetate, 0.015 g of zinc acetate, 0.015 g of manganese acetate and 0.07 g of antimony trioxide, the procedure being in accordance with Example 7. This gives a transparent, colourless to pale grey product which has a relative viscosity of 1.25 and softens at 158° C. This homopolyester has a nitrogen content, determined by combustion analysis of 11.5% (calculated 11.05%).

The glass transition range is 126°–138° C (DSC) and the decomposition temperature determined in accordance with DSC analysis is 368° C.

Example 11

Copolyester formed from 1,1'-methylene-bis-[3-(4-methoxycarbonylbenzyl)-5,5-dimethylhydantoin], 1,1'-methylene-bis-[3-(2'-hydroxyethyl)-dimethylhydantoin] and ethylene glycol A copolyester is prepared, in accordance with Example 7, by transesterifying and polycondensing the mixture of starting monomers which is described below. For this purpose, an excess of ethylene glycol (3.1 g = 0.05 mol) is added to 16.94 g (0.03 mol) of the dicarboxylic acid derivative used in Example 10 and 7.13 g (0.02 mol) of 1,1'-methylene-bis-[3'-(2-hydroxyethyl)-5,5-dimethylhydantoin] and the mixture is reacted using a catalyst mixture composed of: 0.01 g of manganese acetate, 0.01 g of calcium acetate, 0.007 g of zinc acetate and 0.035 g of antimony trioxide.

This gives a copolyester, the acid component of which consists exclusively of 1,1'-methylene-bis-[3-(4-carboxybenzyl)-5,5-dimethylhydantoin], and the diol fraction of which consists to the extent of 1/3 of ethylene glycol and to the extent of 2/3 of 1,1'-methylene-bis-[3-(2'-hydroxyethyl)-5,5-dimethylhydantoin], and which has the following properties:

Softening point at 188° C (Kofler)
Relative viscosity: 1.75
Nitrogen content: 12.2% (calculated 12.3%)
Glass transition range (DSC): 151°–162° C
Decomposition temperature (DSC): 371° C.

Examle 12

Copolyester formed from 1,1'-methylene-bis-[3-(4'-methoxycarbonylbenzyl)-5,5-dimethylhydantoin] and dimethyl terephthalate and from 1,3-dihydroxyethyl-4,5,6,7-tetrabromobenzimidazolone and ethylene glycol A mixture consisting of 11.29 g (0.2 mol) of 1,1'-methylene-bis-[3-(4'-methoxycarbonylbenzyl)-5,5-dimethylhydantoin], 1.94 g (0.01 mol) of dimethyl terephthalate, 2.69 g (0.015 mol) of 1,3-dihydroxyethyl-4,5,6,7-tetrabromobenzimidazolone and 3.72 g (0.06 mol) of ethylene glycol is subjected to transesterification and polycondensation in accordance with Example 7, a mixture of 0.01 g of calcium acetate, 0.01 g of manganese acetate, 0.01 g of zinc acetate and 0.05 g of antimony oxide being used as the catalysts.

The amorphous polyester synthesized in this way, which, owing to its bromine content, is flame-retarding, has the following properties:

| | |
|---|---|
| Softening point (Kofler) | 188° C |
| Relative viscosity | 1.76 |
| Glass transition range (DSC) | 141 – 153° C |
| Decomposition temperature (DSC) | 347° C |

I claim:
1. A linear, thermoplastic polyester having a relative viscosity of 1.2 to 3.0, measured at 30° C on a 1% strength solution consisting of equal parts of phenol and tetrachloroethane, which is characterised by the structural elements of the general formula I

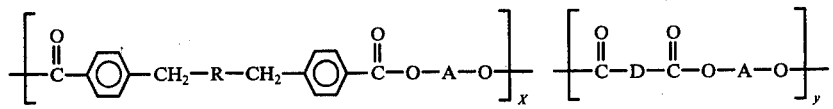

wherein R denotes a N,N-heterocyclic radical of the formula

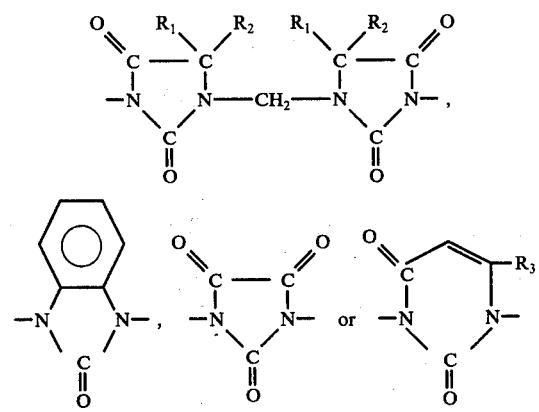

wherein $R_1$ and $R_2$ independently of one another each denote hydrogen or alkyl having 1 to 3 C atoms, $R_3$ denotes hydrogen or methyl, A denotes an aliphatic radical having 2 to 6 C atoms, a N,N'-heterocyclic-aliphatic radical of the formula

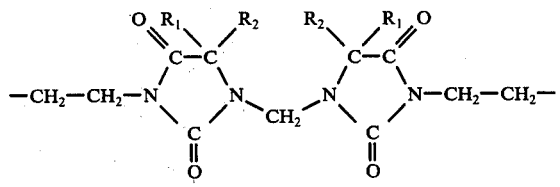

or the formula

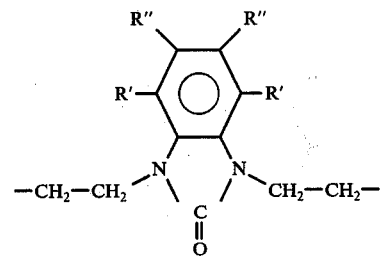

wherein $R_1$ and $R_2$ have the same meaning as above and R' and R" represent H, chlorine or bromine atoms or R' represents a H atom and R" represents a chlorine or bromine atom, D denotes meta- or para-phenylene and x and y represent integers, and the mol fraction $x/(x + y)$ derived from x and y can have values from 0.05 to 0.1.

2. A polyester according to claim 1 wherein, in the formula I, R denotes a N,N-heterocyclic radical of the formula

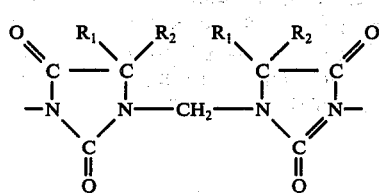

or the formula

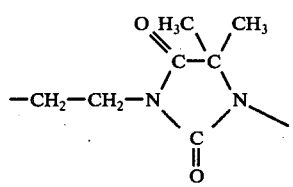

and A denotes an aliphatic radical having 2 to 6 C atoms or a N,N'-heterocyclic-aliphatic radical of the formula

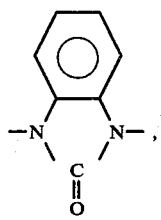

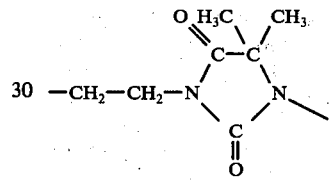

or the formula

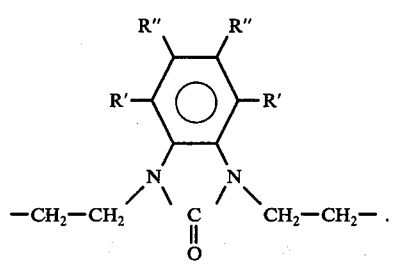

3. A polyester according to claim 1 having a relative viscosity of 1.3 to 2.5, characterised in that, in the formula I, R denotes a N,N-heterocyclic radical of the formula

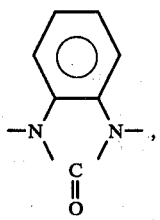

or the formula

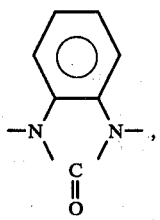

A denotes an aliphatic radical having 2 to 4 C atoms, or a N,N'-heterocyclic-aliphatic radical of the formula

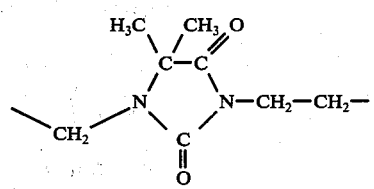

or the formula

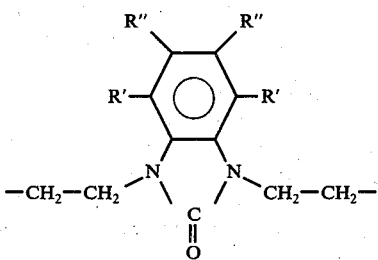

wherein R' and R" represent H, chlorine or bromine atoms or R' represents a H atom and R" represents a chlorine or bromine atom, D denotes para-phenylene and x and y represent integers, and the mol fraction $x/(x + y)$ derived from x and y can have values from 0.1 to 0.95.

4. A homopolyester according to claim 1 and characterised by the recurring structural element of the formula

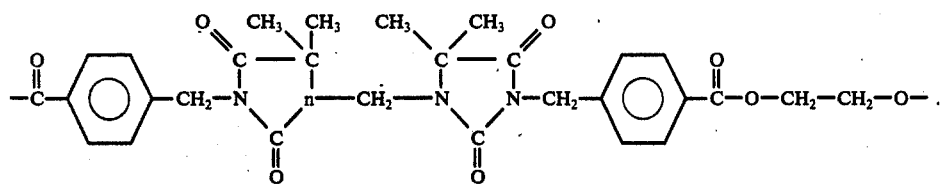
5. A homopolyester according to claim 1 and characterised by the recurring structural element of the formula
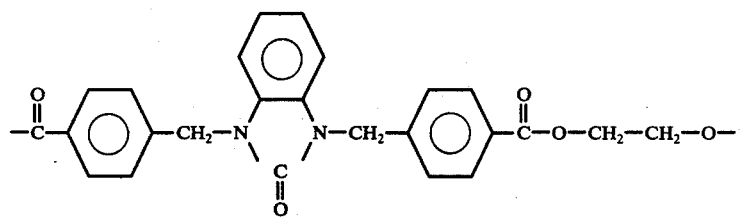
6. A homopolyester according to claim 1 and characterised by the recurring structural element of the formula
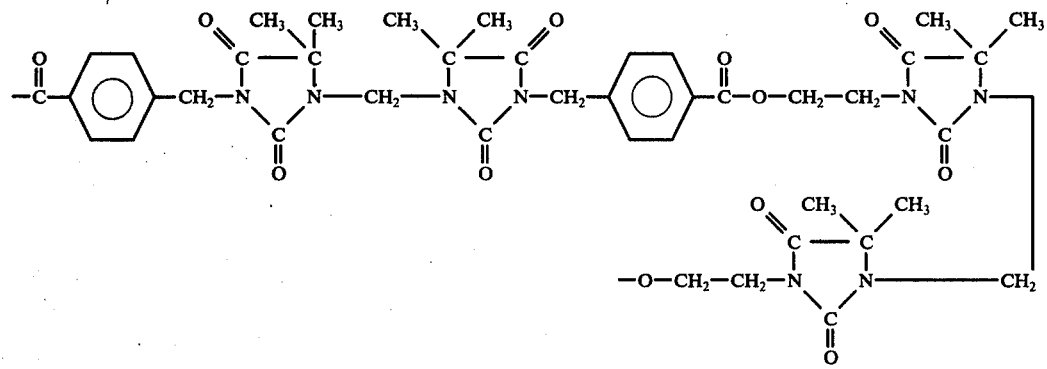
7. A copolyester according to claim 1 and consisting of the structural elements of the formulae
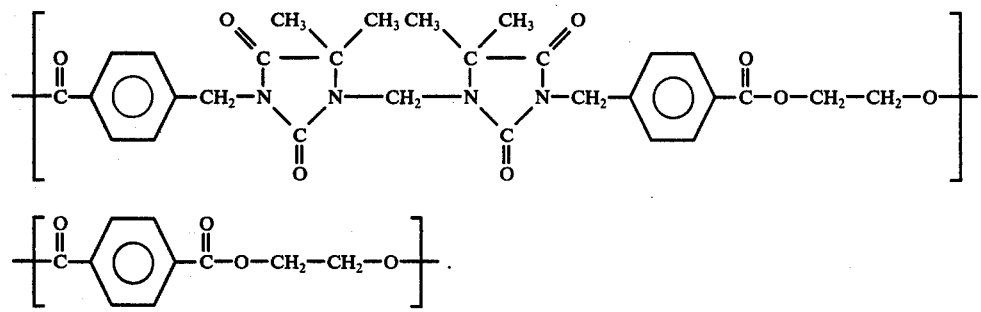
* * * * *